June 11, 1929.  G. F. SHOTTER  1,716,839
APPARATUS FOR THE MEASUREMENT OF THE LEVEL AND FLOW OF LIQUIDS
Original Filed July 22, 1925
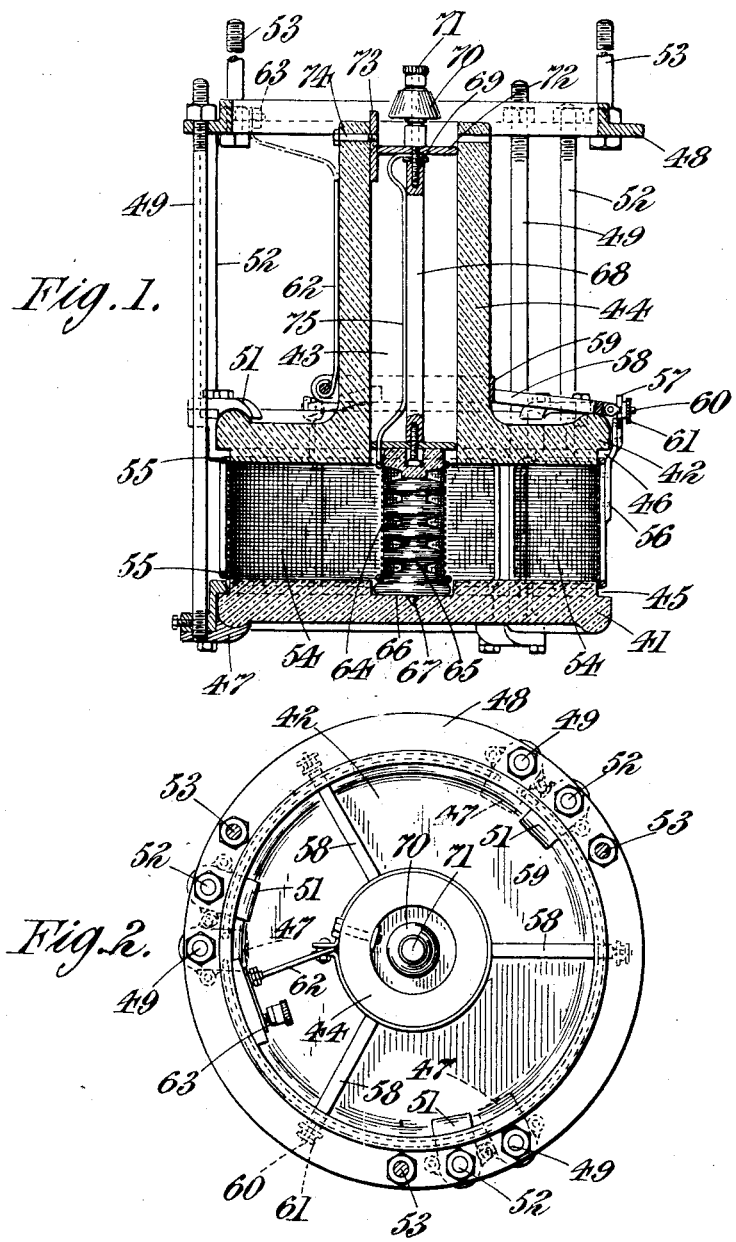

Patented June 11, 1929.

1,716,839

UNITED STATES PATENT OFFICE.

GEORGE FREDERICK SHOTTER, OF NEW SOUTHGATE, ENGLAND.

APPARATUS FOR THE MEASUREMENT OF THE LEVEL AND FLOW OF LIQUIDS.

Original application filed July 22, 1925, Serial No. 45,348, and in Great Britain September 23, 1924. Divided and this application filed March 30, 1927. Serial No. 179,696.

This invention relates to apparatus for the measurement of the level and flow of liquids and it has for its object improvements by which certain advantages shall be obtained. In the specification of prior British Letters Patent No. 17,044 of 1911, granted to the applicant herein, apparatus is described for the electrical measurement of the level or flow of a liquid comprising a main or level-measuring pair of electrodes at a fixed distance apart so immersed in the liquid that the resistance between them changes when the level changes within the limits to be observed, in combination with a compensating pair of electrodes immersed to a constant degree in the liquid or in liquid of similar polarizing properties, an electrical generator and a resistance indicator which has a control-producing circuit and a circuit to provide a deflecting force, the parts being so connected that the generator, the control-producing circuit and the compensating electrodes are in one closed circuit and the generator, the circuit to provide deflecting force and the main electrodes are in a second closed circuit.

The present invention relates to apparatus of the kind described above and more particularly to the construction and arrangement of the compensating electrodes.

In the specification of application Serial No. 45,348 filed 22nd July, 1925, from which the present application has been divided, there is described a construction of electrodes in which said electrodes are mounted on or in a tubular member of insulating material, such as glazed earthenware, of triangular, circular or other section.

The invention will now be described with reference to the accompanying drawing wherein:—

Fig. 1 shows an elevation in section of one form of compensating electrodes according to the present invention; and Fig. 2 shows a plan thereof.

A pair of circular members 41, 42 of insulating material, such as glazed earthenware, are arranged face to face, but spaced apart. The member 42 has a central hole 43 and a tubular portion 44 extending from its outer face and surrounding said hole. The adjacent faces of the circular members 41, 42 have shoulders 45, 46. At several points, for example, three, the member 41 is engaged by two part clamps 47 which are carried from a ring 48 by rods 49, whose position in relation to the ring can be varied by means of nuts 50. Similarly the member 42 is engaged at a number of places, for example, three, by two part clamps 51 which are carried from the ring 48 by rods 52 which can be adjusted in relation to the ring 48 by nuts. The ring 48 is carried from a support above the container for the liquid with which the instrument is to be used by rods 53 by means of which its position in the liquid can be varied. By varying the position of the rods 49 and 52 the distance at which the members 41 and 42 are spaced may be controlled. One electrode comprises metal gauze, for example of nickel-plated copper, arranged round the edges of the circular members 41, 42. The gauze is preferably in three parts 54 each having round its edge a stiff wire 55 to which it is soldered. The ends of the wires, not shown, are bent outwards to engage holes in small plates of insulating material carried on the two part clamps 47. At the centre there is soldered to each part a terminal member 56 which projects upwardly beyond the circular member 42 and has a bifurcated end 57. A metal rod or bar 58 is secured to a metal ring 59 surrounding the lower part of the tubular member 44. At the outer end of the bar 58 is pivotally mounted an extension 60 which is arranged to engage, and be secured by a screw 63 to the bifurcated end 57 of the terminal member 56.

Three such rods 58 extend from the rings 59 each to be connected to one of the gauze parts. The rods 58 and the terminal members 56 constitute further clamping means for the several parts of the electrode.

An electrical connection 62 is taken from the ring 59 to a terminal 63 mounted on the ring 48.

The other electrode is introduced through the tubular portion 44 into the centre of the space between the members 41, 42. It also consists of metal gauze 64, for example, platinized copper, mounted on a grooved cylindrical member 65 of insulating material. The cylindrical member 65 is supported in a depression 66 in the circular member 41, a V-shaped projection 67 on its end face engaging a V-shaped depression to position it. At the other end the cylindrical member 65 is mounted on a rod 68 of insulating material which is connected at the top to a metal rod 69 which passes through an insulator 70 to a terminal 71. The rod 68 is held in position by a plate 72 of insulating material which engages at its edge with a block 73 secured by a screw 74 in the wall of the tubular member 44. Electrical connection is made to the terminal 71 from the gauze 64 by a wire or rod 75 soldered to the gauze and secured to the metal rod 69.

By varying the distance between the circular members 41, 42 the height of the electrolyte between the electrodes may be varied at will.

In use the compensating pair of electrodes are supported in such a way that they are always completely immersed.

The form of standard path or compensating electrodes illustrated is preferably used in connection with low conductivity liquids.

The electrodes have been described as constructed of wire gauze, but it will be understood that they may, if desired, be formed of wire, preferably platinum or platinized wire wound on frames of insulating material. Further the gauze may be of other metal than platinized copper, such for example as nickel or ferro-nickel, though platinum or platinized metal is preferred.

The well known system of guard wiring may be applied for the purpose of preventing the measurement of leakage currents.

What I claim is:—

1. For apparatus of the kind described for the electrical measurement of the level of a liquid a compensating pair of electrodes to be completely immersed in liquid comprising a pair of opposed circular members of insulating material spaced a fixed distance apart one having a central hole and a tubular portion extending from its outer face surrounding said hole, an electrode extending around and between said members and carried peripherally thereon and a second electrode disposed in the space between said members which is inserted through the tubular portion and central hole.

2. For apparatus of the kind described for the electrical measurement of the level of a liquid a compensating pair of electrodes to be completely immersed in liquid comprising a pair of opposed circular members of insulating material spaced a fixed distance apart one having a central hole and a tubular portion extending from its outer face surrounding said hole, an electrode extending around and between said members and carried peripherally thereon and a second electrode of wire carried on a grooved cylindrical member disposed between said members which is inserted through the tubular portion and central hole.

3. For apparatus of the kind described for the electrical measurement of the level of a liquid a compensating pair of electrodes to be completely immersed in liquid comprising a pair of opposed circular members of insulating material spaced a fixed distance apart, an electrode formed in a plurality of parts extending around and between said members and carried peripherally thereon and a second electrode of wire carried on a grooved cylindrical member disposed in the space between said members.

4. For apparatus of the kind described for the electrical measurement of the level of a liquid a compensating pair of electrodes to be completely immersed in liquid comprising a pair of opposed circular members of insulating material spaced a fixed distance apart one of said circular members having a depression on its inner face an electrode formed in a plurality of parts extending around and between said members and carried peripherally thereon, a terminal member secured to each part and a second electrode of wire carried on a grooved cylindrical member disposed in the space between said members.

5. For apparatus of the kind described for the electrical measurement of the level of a liquid a compensating pair of electrodes to be completely immersed in liquid comprising a pair of opposed circular members of insulating material spaced a fixed distance apart one having a central hole and a tubular portion extending from its outer face surrounding said hole, the other having a depression on its inner face, an electrode formed in a plurality of parts extending around and between said members and carried peripherally thereon, a terminal member secured to each part a second electrode of wire carried on a grooved cylindrical member disposed in the space between said members which is inserted through the tubular portion and central hole and positioning means on the cylindrical member to engage the depression in the circular member.

Dated this 4th day of March, 1927.

GEORGE FREDERICK SHOTTER.